United States Patent [19]
Johnston

[11] Patent Number: 6,004,107
[45] Date of Patent: Dec. 21, 1999

[54] WATER REMOVAL APPARATUS

[76] Inventor: Gary L. Johnston, P.O. Box 183, Cowarts, Ala. 36321

[21] Appl. No.: 08/883,726

[22] Filed: Jun. 27, 1997

[51] Int. Cl.$^6$ ...................................................... F04B 17/06
[52] U.S. Cl. ............................................ 417/231; 417/572
[58] Field of Search ................................... 417/231, 232, 417/313, 572

[56] References Cited

U.S. PATENT DOCUMENTS

| 3,832,093 | 8/1974 | Shirek et al. | 417/231 |
| 3,910,722 | 10/1975 | Hochmuth | 417/231 |
| 5,364,233 | 11/1994 | Benoit | 417/231 |

FOREIGN PATENT DOCUMENTS

| 401317 | 2/1974 | U.S.S.R. | 417/231 |

Primary Examiner—Charles G. Freay

[57] ABSTRACT

A water removal apparatus is provided which enables the user to remove water from a wet surface, such as a back yard lawn or sports field. The apparatus includes a frame structure, a press member, and a water removal system. The press member is rotatably mounted to the frame structure. The press member has openings through which water passes. The water is temporarily collected within the press member as the press member is rolled across the wet surface. The water removal system removes the water from the press cylinder and places it in a storage member. The water may then be transported to a different area, and the storage member drained.

20 Claims, 7 Drawing Sheets

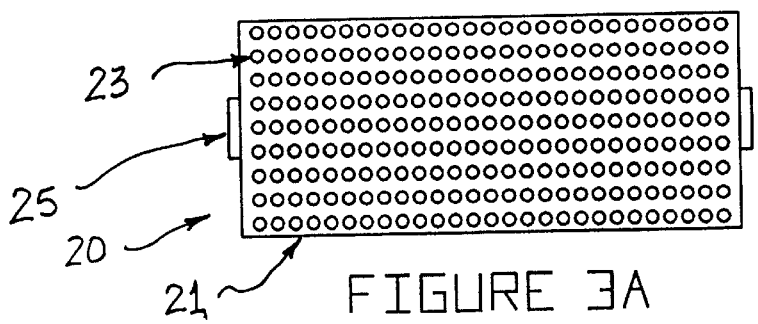
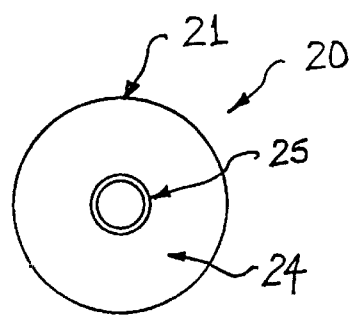
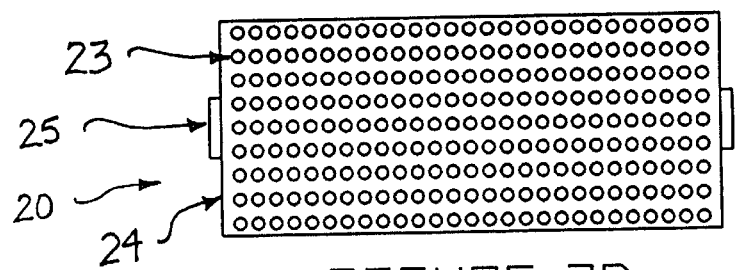
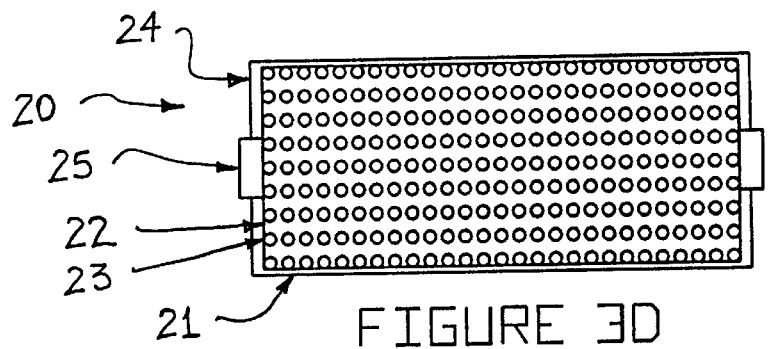

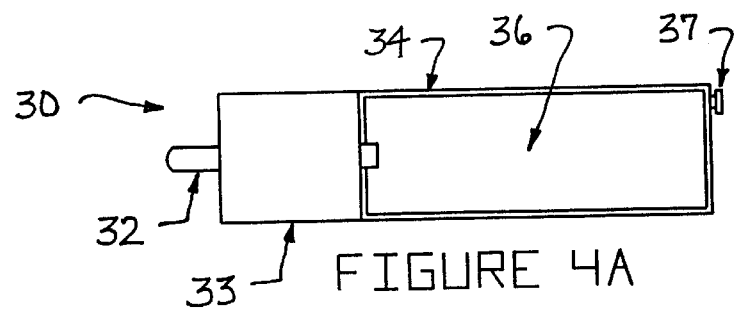
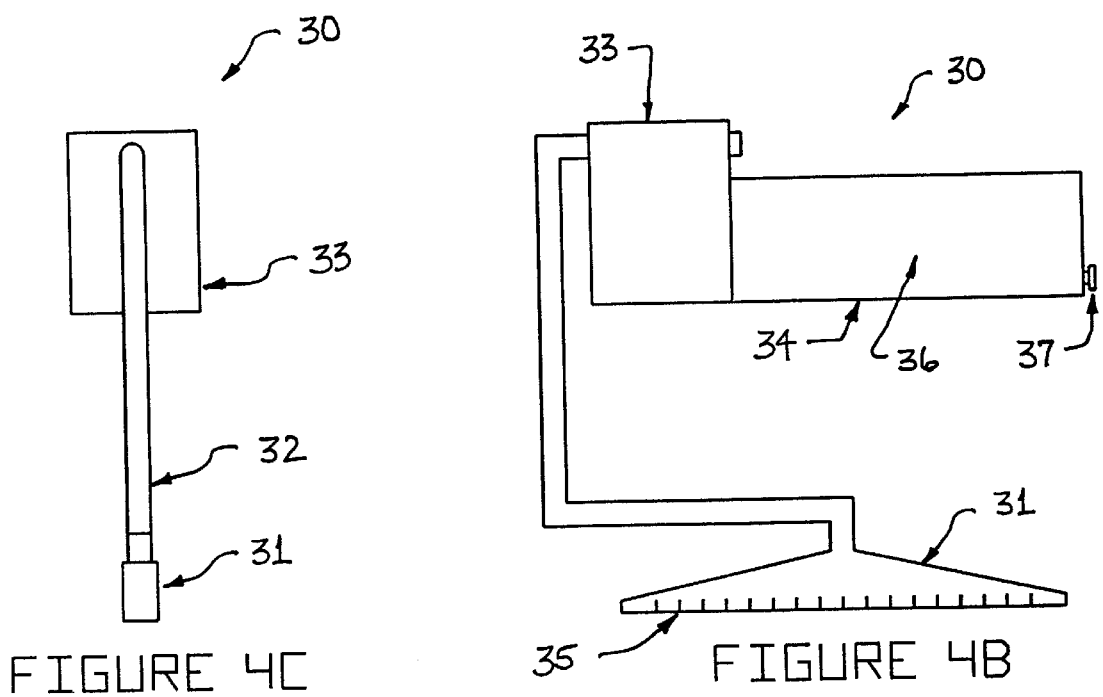

WATER REMOVAL APPARATUS

BACKGROUND OF THE INVENTION

This invention relates to an apparatus which may be used to remove water from a wet surface. For example, after a rainstorm, water will reside on outdoor lawns and grass fields, many times in the form of a puddle. There are many instances where parties, social functions, or sporting events are scheduled to take place on the outside lawn or field, only to be postponed or cancelled due to a rain soaked ground. Standing or playing on a rain soaked surface can prove to be very undesireable. This device will allows the user to remove much of the water from the wet surface, thus allowing the event to take place as scheduled. Given the fact that there are a number of yard and lawn maintenance types of equipment, it has come as a surprise that no one has effectively developed an apparatus which may be used to easily remove water from a wet surface, such as a back yard lawn or a grass field.

SUMMARY AND OBJECTS OF THE INVENTION

It is the object of this invention to provide a water removal apparatus which may easily be used to remove water from a wet surface. The main purpose of this application is to demonstrate an apparatus which performs the stated function, and to demonstrate the many options and configurations this apparatus may take on.

Briefly stated, the apparatus that forms the basis of the present invention comprises a frame structure, a press member, and a water removal system. The press member and water removal system mount upon the frame structure. Optional items include a handle member, a support wheel system, and an attachment member. The apparatus may also be part of a motorized unit.

The design of the apparatus is such that the press member moves along the wet surface temporarily collecting water. The water is then collected from the press member and stored by the water removal system. The water may then be transported to a different location, and released from the water removal system via a drain. Other objects, features, and advantages for this invention will be apparent from the following detailed description and the appended claims, references being made to the accompanying drawings forming a part of the specification, wherein like reference numerals designate corresponding parts of the several views.

BRIEF DESCRIPTION OF THE DRAWINGS

FIG. 3A is a top view of the press member of the water removal apparatus.

FIG. 3B is a front view of the press member of the water removal apparatus.

FIG. 3C is a side view of the press member of the water removal apparatus.

FIG. 3D is a cross-sectional view of the press member of the water removal aparatus.

FIG. 4A is a top view of the water removal system of the water removal apparatus.

FIG. 4B is a front view of the water removal system of the water removal apparatus.

FIG. 4C is a side view of the water removal system of the water removal apparatus.

DETAILED DESCRIPTION OF THE PREFERRED EMBODIMENT

Before explaining in detail the present invention, it is to be understood that the invention is not limited in its application to the details of construction or arrangement of parts illustrated in the accompanying drawings, since the invention is capable of other embodiments and of being practiced or carried out in various ways. Also it is to be understood that the phraseology and terminology employed herein is for the purpose of description, and not limitation.

Figure 1A:
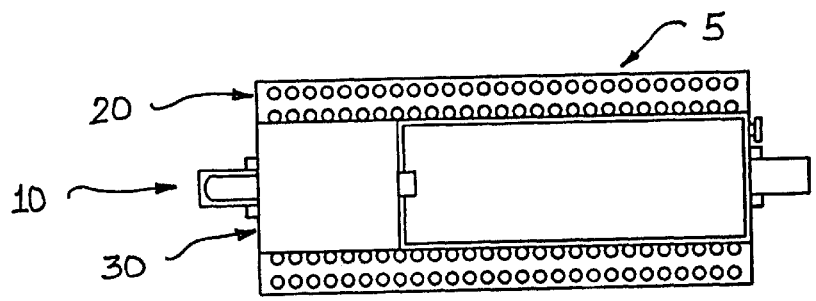
FIG. 1A is a top view of the water removal apparatus.
Figures 1B, 1C:
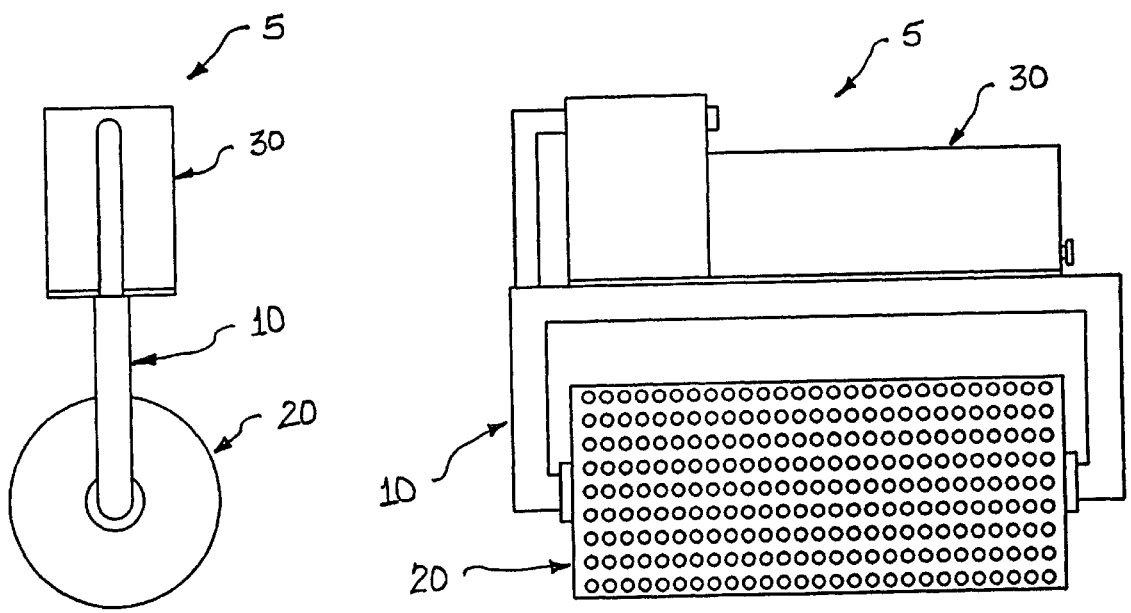
FIG. 1B is a front view of the water removal apparatus.
FIG. 1C is a side view of the water removal apparatus.

As best can be seen by references to the drawings, and in particular to FIGS. 1A–1C, the water removal apparatus that forms the basis of the present invention is designated generally by the reference numeral 5, and includes a frame structure 10, a press member 20, and a water removal system 30. The press member 20 rotatably mounts to frame structure 10, with the water removal system 30 also mounted to frame structure 10.

Figure 2A:
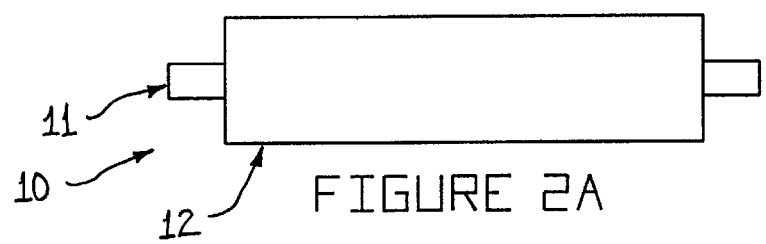
FIG. 2A is a top view of the frame structure of the water removal apparatus.
Figure 2C:
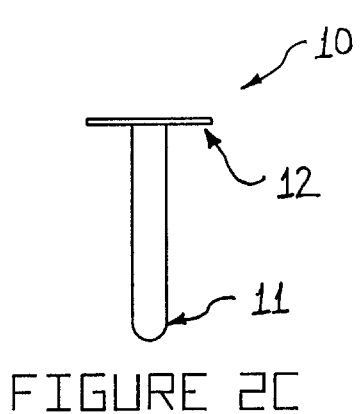
FIG. 2C is a side view of the frame structure of the water removal apparatus.
Figure 2B:
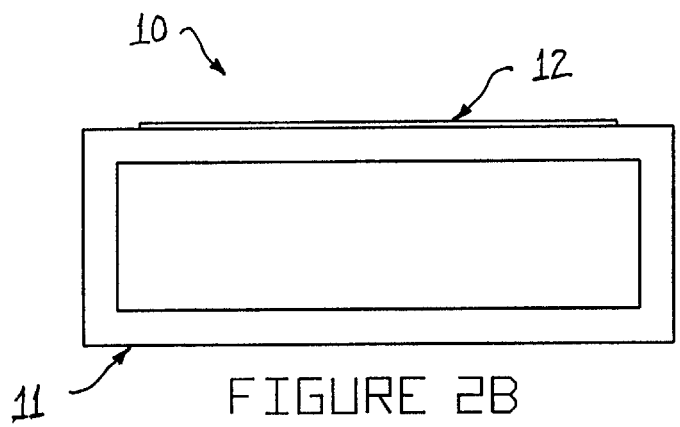
FIG. 2B is a front view of the frame structure of the water removal apparatus.

As may be seen in FIGS. 2A–2C, the frame structure 10 comprises an axle member 11 and a system support 12. The axle member is used to support the press member 20, while the system support 12 is used to support water removal system 30.

As may also be seen in FIGS. 3A–3D, the press member 20 is a hollow cylindrical-shaped structure having an outer surface 21, an inner surface 22, openings 23, and side support members 24. Side support members 24 have support openings 25.

FIGS. 4A–4C demonstrate the various components of the water removal system 30. Water removal system 30 is comprised of water collection member 31, water transport member 32, vacuum system 33, and water storage member 34. Water collection member 31 is a hollow structure having openings 35 along the bottom. Water storage member 34 has a storage tank 36, and a drain 37 which may be opened and closed.

As may be seen in FIGS. 1A–1C, press member 20 rotatably mounts to frame structure 10 along axle member 11, through support openings 25. Support openings 25 serve as bearings to allow easy rotation. The water storage member 34 and the vacuum system 33 of water removal system 30 mount on system support 12. Water transport member 32 is a tube-like structure connecting vacuum system 33 and water collection member 31. It may be mounted to or within frame structure 10, and is used to transport water from the water collection member 31 to vacuum system 33. Preferably, the water transport member 32 is mounted through said axle member 11 of frame structure 10. Vacuum system 33 is a typical type of water vacuum system, as may be found on many type of carpet cleaner devices and shop type vacuum, which are capable of vacuuming water. Vacuum system 33 might operate off an electrical system, such as a battery or a power cord and electrical outlet, or may be operated off a fuel such as gasoline. Each type is well known in industry.

Figure 5:
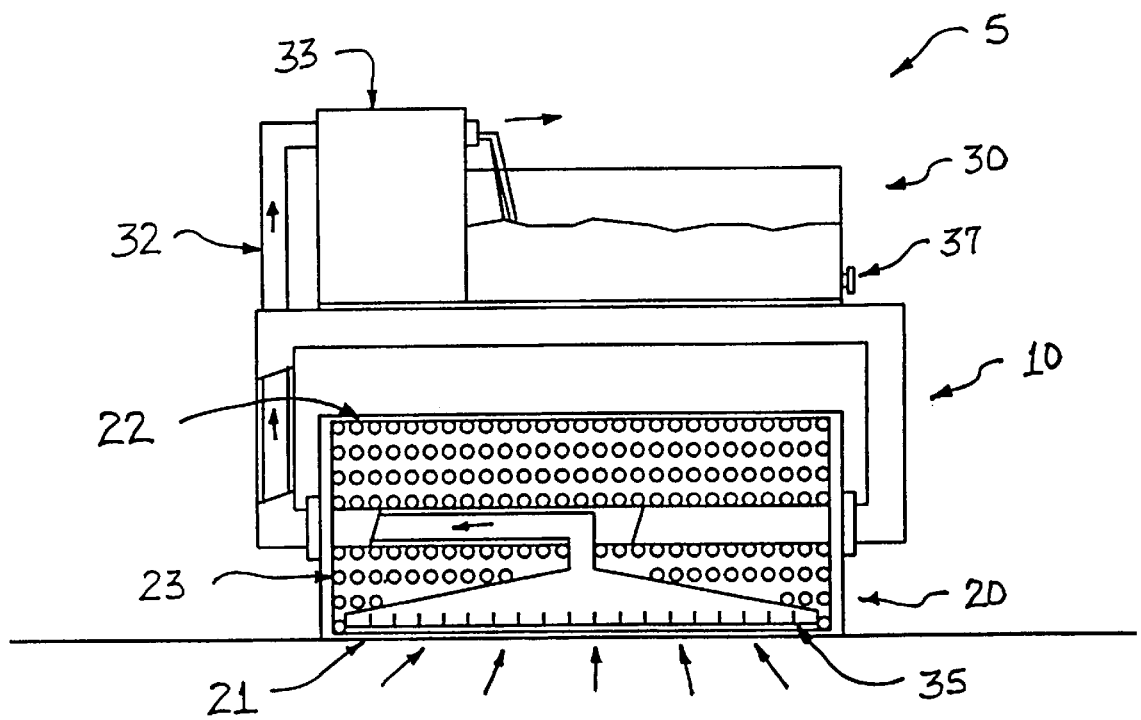
FIG. 5 is a front view of the water removal apparatus while in operation.

The operation of the water removal apparatus may be seen in FIG. 5. As the press member 20 is rotated along a wet surface, the press member 20 presses against the wet surface, causing water to be squeezed through openings 23, and onto inner surface 22. The water is vacuumed from the inner surface of the press member, through openings 35 of water collection 31. Water collection member 31 is mounted to frame structure 10 slightly above the inner surface 22 of press member 20, above the point where the outer surface 21 of press member 20 is in contact with the wet surface. The water is then vacuumed into water storage member 34, through water transport member 32, by vacuum system 33. As water storage member 34 is filled, press member 20 presses harder against the wet surface, squeezing more water through the openings 23. Thus it is favorable to have some water in the container at all times. When water storage member 34 becomes full, the apparatus may be moved to a different location, and the water emptied through drain 37. The connections between water collection member 31, water transport member 32, and vacuum system 33 should be as air tight as possible to maintain a good vacuum.

Figure 6:
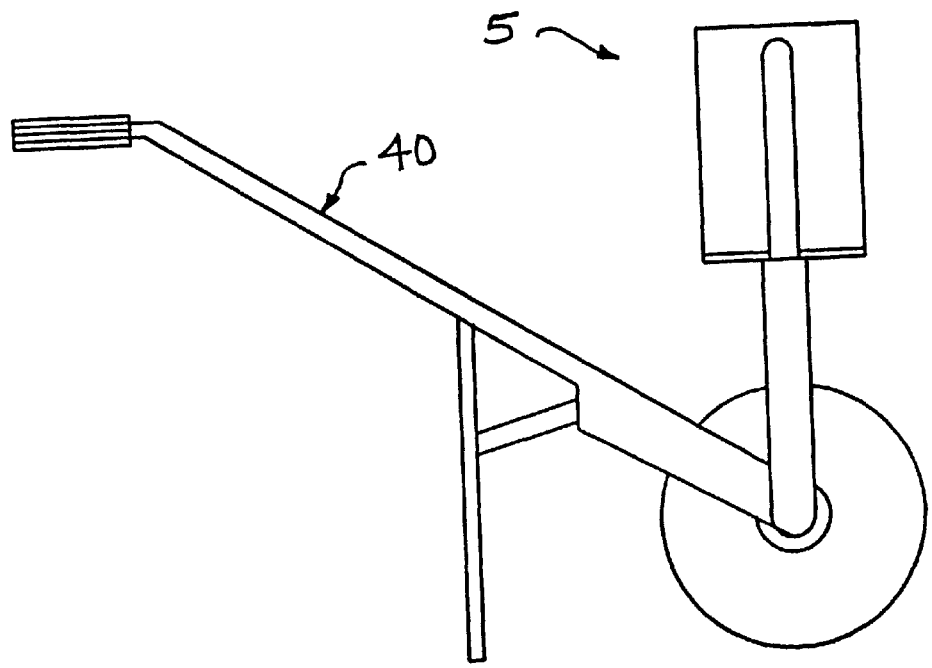
FIG. 6 is a side view of the water removal apparatus with an optional handle member.
Figure 7:
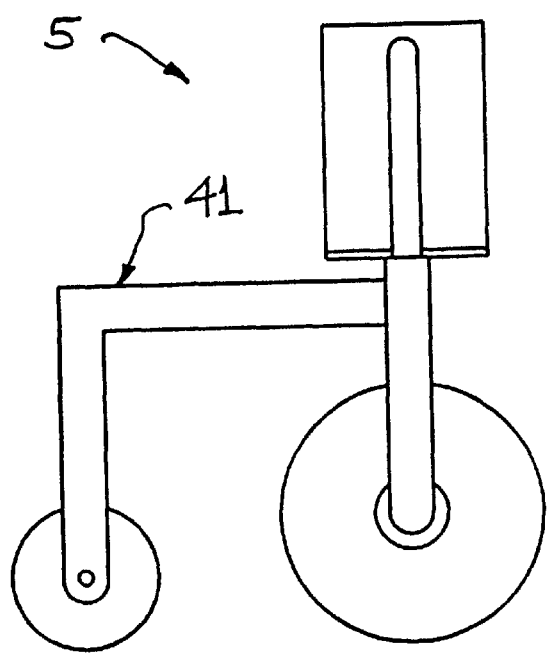
FIG. 7 is a side view of the water removal apparatus with an optional wheel support system.
Figure 8:
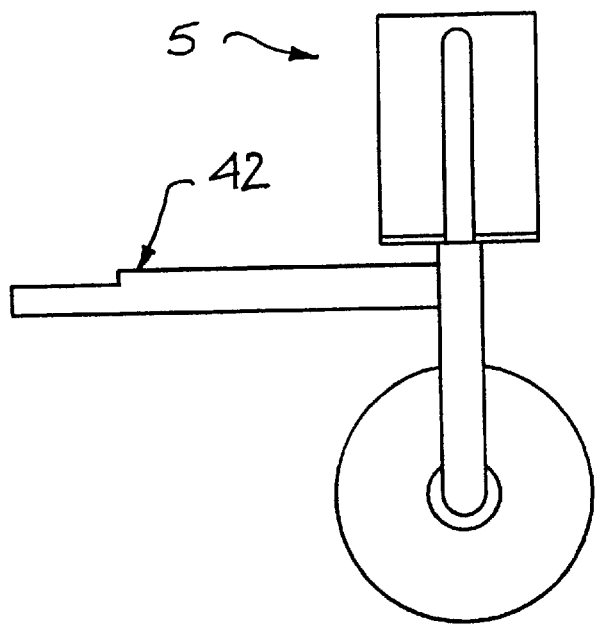
FIG. 8 is a side view of the water removal apparatus with an optional attachment member.
Figure 9:
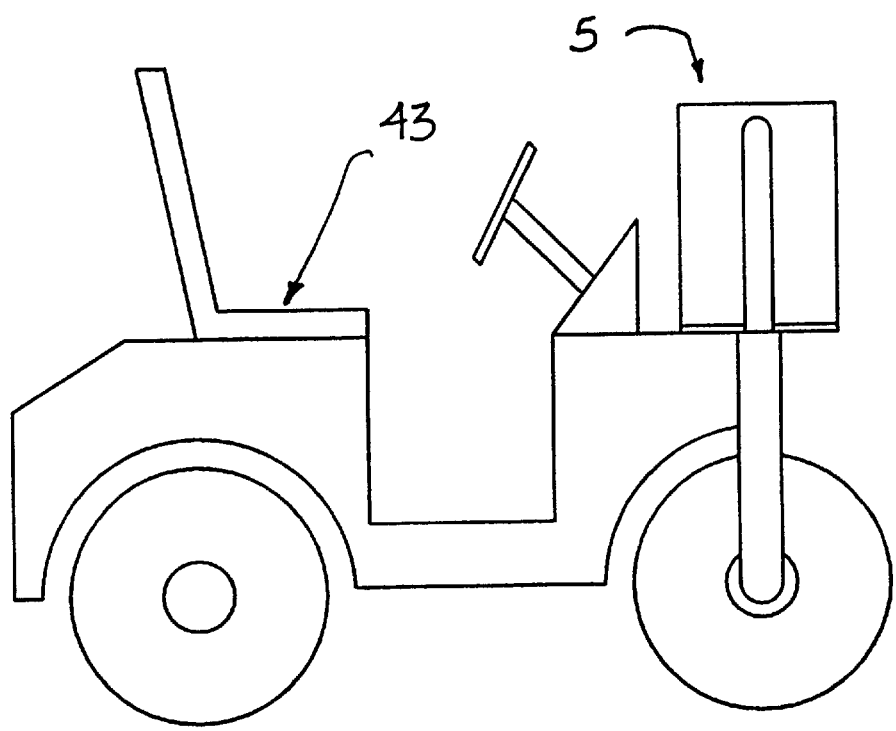
FIG. 9 is a side view of a motorized device having the water removal apparatus incorporated.

FIGS. 6, 7, 8, and 9 demonstrate different options and different verisons of surface water removal apparatus 5. FIG. 6 demonstrates the addition of an optional handle member 40 so that the user is able to manually move the apparatus across a wet surface. FIG. 7 demonstrates an optional wheel support system 41 which may provide better balance for the apparatus. FIG. 8 demonstrates an attachment member 42 which enables the apparatus to be attached to a motorized device, such as a lawn tractor. FIG. 9 demonstrates the water removal apparatus as a component of a motorized device 43.

Many variations of the water removal apparatus exist, along with the configurations described above. While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

I claim:

1. A water collection apparatus comprising:
    a frame structure;
    a press member rotatably mounted to said frame structure, said press member having an outer surface, an inner surface, and openings extending through said outer surface and said inner surface;
    a water removal system mounted to said frame structure and extending along the inner surface of said press member; whereby
    rotating the outer surface of said press member against a wet surface squeezes water from the wet surface through said openings of said press member, and onto the inner surface of said press member, such that water may be removed from the inner surface of said press member by said water removal system.

2. The apparatus as claimed in claim 1, said frame structure further comprising an axle member upon which said press member rotates; and a system support upon which said water removal system is mounted.

3. The apparatus as claimed in claim 2, said press member being generally cylindrical in shape and having a right and left side, with an opening along each of said side, through which said press member rotatably mounts upon said axle member of said frame structure.

4. The apparatus as claimed in claim 1, said water removal system comprising:
    a water collection member;
    a water transport member;
    a vacuum system;
    a water storage member;
    whereby water is vacuumed from the inner surface of said press member into said water collection member by said vacuum system, and transported from the water collection member to the water storage member through said water transport member.

5. The apparatus as claimed in claim 4, said water collection member being a hollow structure with at least one opening along the bottom, said water collection member being mounted on said frame structure such that the opening of said water collection member the near the inner surface of said press member, above the point of contact between the outer surface of said press member and the wet surface.

6. The apparatus as claimed in claim 4, said water transport member of said water removal system extending through the axle member of said frame structure.

7. The apparatus as claimed in claim 1 further comprising a handle member, said handle member being used to manually move said press member of said apparatus across a wet surface.

8. The apparatus as claimed in claim 1 further comprising a wheel support system.

9. The apparatus as claimed in claim 1 further comprising a means for attaching said apparatus to a motorized device.

10. The apparatus as claimed in claim 1, said apparatus being a component of a motorized vehicle.

11. A water collection apparatus comprising:
    a frame structure;
    a rotatable member mounted to said frame structure, said rotatable member having an outer surface and a hollow portion, with openings extending from said outer surface into said hollow portion;
    a water removal means mounted to said frame structure, said water removal means extending into said hollow portion of said rotatable member; whereby
    rotating the outer surface of said rotatable member against a wet surface squeezes water from the wet surface into the hollow portion of said rotatable member through said openings of said rotatable member, such that water may be removed from the hollow portion of said rotatable member by said water removal system.

12. The apparatus as claimed in claim 11, said frame structure further comprising an axle member upon which said rotatable member rotates; and a system support upon which said water removal system is mounted.

13. The apparatus as claimed in claim 12, said rotatable member being generally cylindrical in shape and having a right and left side, with an opening along each of said side, through which said rotatable member mounts upon said axle member of said frame structure.

14. The apparatus as claimed in claim 11, said water removal system comprising:
    a water collection member;
    a water transport member;
    a vacuum system;

a water storage member;

whereby water is vacuumed from the hollow portion of said rotatable member into said water collection member by said vacuum system, and transported from the water collection member to the water storage member through said water transport member.

15. The apparatus as claimed in claim 14, said water collection member being a hollow structure with at least one opening along the bottom, said water collection member being mounted on said frame structure such that the opening of said water collection member is mounted within the hollow portion of said rotatable member, generally above the point of contact between the outer surface of said rotatable member and the wet surface.

16. The apparatus as claimed in claim 14, said water transport member of said water removal system extending through the axle member of said frame structure.

17. The apparatus as claimed in claim 11 further comprising a handle member, said handle member used to maunually move said rotatable member of said apparatus across a wet surface.

18. The apparatus as claimed in claim 11 further comprising a wheel support system.

19. The apparatus as claimed in claim 11 further comprising a means for attaching said apparatus to a motorized vehicle.

20. The apparatus as claimed in claim 11, said apparatus being a component of a motorized vehicle.

* * * * *